(12) United States Patent
Gardiner (10) Patent No.: US 7,380,859 B2
(45) Date of Patent: Jun. 3, 2008

(54) SEATING ARRANGEMENT

(75) Inventor: Geoffrey Gardiner, Spa (BE)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 11/427,223

(22) Filed: Jun. 28, 2006

(65) Prior Publication Data

US 2008/0001424 A1    Jan. 3, 2008

(51) Int. Cl.
*B60N 2/01* (2006.01)
(52) U.S. Cl. .................. 296/64; 296/65.11; 296/65.13
(58) Field of Classification Search .................. 296/63, 296/64, 65.11, 65.12, 65.13, 65.14, 65.15; 297/232, 257
See application file for complete search history.

(56) References Cited

U.S. PATENT DOCUMENTS

| | | | | | |
|---|---|---|---|---|---|
| 1,397,594 | A | * | 11/1921 | Moses | 296/110 |
| 5,116,097 | A | * | 5/1992 | Bulgari | 296/64 |
| 5,611,589 | A | * | 3/1997 | Fujii et al. | 296/64 |
| 5,947,541 | A | * | 9/1999 | Behrens et al. | 296/64 |
| 5,951,084 | A | * | 9/1999 | Okazaki et al. | 296/37.16 |
| 6,457,765 | B1 | * | 10/2002 | Bergquist et al. | 296/64 |
| 6,572,171 | B1 | * | 6/2003 | Pautz et al. | 296/64 |
| 6,817,645 | B2 | * | 11/2004 | Taguchi et al. | 296/64 |
| 6,827,388 | B2 | * | 12/2004 | Kayumi et al. | 296/64 |
| 2001/0030440 | A1 | * | 10/2001 | Ney | 296/65.15 |
| 2006/0076795 | A1 | * | 4/2006 | Slade | 296/64 |

FOREIGN PATENT DOCUMENTS

EP        0588693   A1 *   3/1994

* cited by examiner

*Primary Examiner*—Jason S Morrow
(74) *Attorney, Agent, or Firm*—Gigette Bejin (57) ABSTRACT

The invention relates to a seat row arrangement for a vehicle, comprising two outer seats (5) and a central seat (4). It is defined in that the central seat (4*d*) can be displaced forward and/or rearward from the normal position between the two outer seats (5*d*) into a front and/or a rear seat position. It is thus possible for the vehicle occupants in the seat row to obtain more comfortable seat positions, which are offset in the longitudinal direction. The effect is produced immediately on displacing the central seat (4*d*), since the shoulders of the vehicle occupants are now no longer arranged in a row. Because the vehicle occupants are now no longer sitting directly shoulder to shoulder, the vehicle occupants have greater shoulder room and there is an immediate increase in their freedom of movement and feeling of space in the offset seat position.

9 Claims, 6 Drawing Sheets

SEATING ARRANGEMENT

The invention relates to a seat row arrangement for a vehicle.

Such a seat row arrangement is known in vehicles, for example for the first and/or a rear seat row of large-volume sedans or minibuses/minivans. Depending on the width of the vehicle and the size of the vehicle occupants, losses in comfort may occur here if the vehicle occupants are seated too closely next to one another in the seat row. A person's widest point with respect to overall body size is across the shoulder, for which reason the provision of shoulder room is a decisive factor in determining the feeling of comfort. The shoulder room enjoyed by a vehicle occupant affects the vehicle occupant's freedom of movement and feeling of space. Independently, too narrow a seat arrangement may also constrict the freedom of movement, for example of the arms. The driver in particular may be constricted in his freedom of movement by the passenger sitting next to him such that he is unable to concentrate fully on the traffic. However, the passengers in a rear seat row too, regardless of whether this is arranged in the second or third seat row, may be unpleasantly constricted, particularly in the shoulder region.

The object of the invention is therefore to provide a seat row arrangement which enables the vehicle occupants to have an increased feeling of comfort, in particular a greater feeling of space and a larger freedom of movement.

Because the central seat can be displaced forward and/or rearward from the normal position between the two outer seats into a front and/or a rear seat position, it is possible for the vehicle occupants in the seat row to obtain more comfortable seat positions, which are offset in the longitudinal direction. The effect is produced immediately on displacing the central seat, since the shoulders of the vehicle occupants are now no longer arranged in a row. Because the vehicle occupants are now no longer sitting directly shoulder to shoulder, the vehicle occupants have greater shoulder room and there is an immediate increase in their freedom of movement and feeling of space in the offset seat position.

In this case, this seat row arrangement is possible in each seat row, i.e. both in the front seat row and in the second or third seat row of a vehicle. If the rearmost seat row of a vehicle is involved, the rear seat when displaced is normally displaced into the luggage space, which leads to a slight reduction in size thereof. However, this minor disadvantage is largely compensated by the gain in comfort for the passengers in the seat row. If, by contrast, the central seat is pushed forward, provided that the foot space then remaining is large enough for the comfort requirements of the passenger in the central seat, there is even an increase in the volume of the luggage space.

The displacement of the central seat may also be used as a function when the central seat is occupied by a small child, as disclosed, for example, in JP2003127722 for an outer seat. The central seat can then be displaced forward from the second seat row until it is situated directly behind the driver's seat, which means that if only a driver is traveling with a child, the driver has direct access, even during the journey, to the child on the central seat without the driver having to change his seat position. The same also applies of course to access by a front-seat passenger. It is then possible, for example, for two adults to be seated on the front seats while the small child is situated almost directly between the two adults in a front seat position on the central seat of the second seat row. Overall, this allows considerably simpler access to the small child than in seat arrangements known up until now.

The central seat here may have a diagonal direction of displacement as seen with respect to the longitudinal axis of the vehicle. For example, if the central seat of a front seat row is pushed forward or rearward, it may at the same time experience a slight outward displacement, away from the driver. This situation may also be utilized in a rear seat row if the central seat, as described above, is occupied by a small child. The seat may then advantageously be displaced to the side of the driver or front passenger. However, the lateral displacement may also be utilized during the rearward displacement in order, for example, to obtain a larger luggage space on one side next to the central seat in the rear seat position.

The central seat in the front and/or rear seat position advantageously has a seat height which differs from that in the normal position. For example, the central seat in the rear seat position may have an elevated position, with the result that the passenger in the central seat is given a better view and, if appropriate, may maintain better contact with the passengers in the outer seats. Conversely, the seat height may be lowered in a front seat position so that the driver and/or the passengers in the outer seats do not have their view restricted.

Furthermore, the central seat may be rotatable in the front and/or rear seat position. "Rotatable" in this sense means rotation about the vertical axis, i.e. the seat position is then no longer parallel to the longitudinal axis of the vehicle but is at an angle thereto. This situation may be used for example in order to provide the foot space for the passenger in the central seat with an optimum configuration if said seat is, for example, situated in the front seat position, with the result that this passenger's legs are situated between the driver and the front-passenger seat. His legs should then point away from the driver, preferably in the direction of the front passenger, which can be simply brought about by rotating the seat in the direction of the front passenger. This rotation is also helpful if, in addition to the longitudinal displacement, the central seat experiences a lateral displacement. Here too, the legroom for the passenger may be adapted by rotating the central seat.

It is advantageous here if the displacement of the central seat into the front and/or the rear seat position produces a simultaneous rotation of the seat. The passenger need then not worry about the correct rotational setting of the seat; rather, this setting is given automatically by the instantaneous longitudinal position of the central seat.

In a further embodiment, at least one of the outer seats can also be displaced into a front and/or rear seat position. This measure, disclosed for example in WO 02/04245, may be advantageously combined with the inventive seat arrangement. It is then possible if, for example, the central seat is displaced rearward for one or both outer seats to be displaced forward, thereby enabling the displacement of the central seat to be slighter. However, it is also possible for one or both outer seats likewise to be pushed rearward with the central seat, but to a lesser degree. The legroom for the outer seats is then likewise increased. Conversely, it is equally possible, however, to displace the central seat slightly forward and one or both outer seats rearward. Overall, the luggage space thus remains approximately the same size while the feeling of comfort experienced in particular by the passengers in the outer seats increases significantly. In principle, this seat row arrangement makes possible any displacement of the three seats among and relative to one another.

It is also advantageous if at least one of the outer seats can be displaced into an inner seat position if the central seat is not situated directly next to this seat. If the space to the inside of and next to an outer seat is free because the central seat is situated in a front or rear seat position and/or the outer seat is situated in a front or rear seat position, the outer seat may be displaced inwardly by a certain degree. The passenger in the outer seat is thus given greater shoulder room with respect to the vehicle side wall, imparting an increased feeling of comfort to him. The outer seat here may have a diagonal direction of displacement inwardly as seen with respect to the transverse axis of the vehicle. This provides simpler handling for the passenger by directly predetermining a seat position which comprises a longitudinal and transverse displacement of the outer seat.

In addition, the displacement of the outer seat into a different seat position may produce a simultaneous rotation of the seat. Such a rotated seat position, allowing the passenger the greatest possible leg room, for example, can then be intentionally set. This also facilitates handling for the passenger of the outer seat since he now does not need to seek or set this optimum, rotated seat position himself; rather, this seat position results automatically from the displacement.

In a further embodiment, at least one of the outer seats can be rotated if the central seat is not situated in a position directly next to this seat. This function may be advantageously used if, for example, the central seat is situated in a rear seat position. It is then possible for the passengers in the outer seats to rotate their seats to have a direction of view to the inside such that contact with the passenger in the central seat is facilitated, i.e. the outer passengers do not have to rotate their heads so much in order to see the central passenger. In addition, the feeling of comfort increases since shoulder room is extended by the rotational movement, since the distance between the side wall and the outer passenger is perceived to be greater.

In an advantageous embodiment, the seats can be displaced on seat rails mounted on the vehicle floor. This constitutes a very sturdy construction and may be achieved structurally with little outlay. Furthermore, the seat rails make it possible to displace all three seats without problems.

In a further embodiment of the invention, each seat is anchored to the vehicle floor and has dedicated seat rails. Each seat is then displaced by means of its dedicated seat rails. Such a construction is favorable if, for example, there are various vehicle versions and not all versions are designed with the inventive displacement function. In that case, only mounting points where the seats can be mounted are provided in the vehicle. Also favorable, however, is the combination of these seat rails on the seat with seat rails in the vehicle floor. It is then possible, for example, for a relatively large displacement to occur in the longitudinal direction via the vehicle-side seat rails, whereas a slight lateral displacement occurs via the seat rails belonging to the seat. This may equally also occur in the reverse order.

It is not an obstacle to the present design if individual seats of this seat row arrangement may be removed at least temporarily from the seat row, because not all of the seats need to be occupied with passengers and in order, for example, to obtain more luggage space and/or to achieve an even greater feeling of comfort for the remaining passengers.

Furthermore, the invention relates to a vehicle having a seat row arrangement, in which a central seat can be displaced rearward, and in which a vehicle floor has a lower level in front of the seat row, in the foot space of the seat row, and a higher level behind the seat row. Such a vehicle is represented by every known passenger car in which a foot space for the passengers in the rear, second seat row is situated in front of this seat row and a higher-level luggage space is situated behind the seat row. The foot space is situated in front of the rear axle and can thus be lowered to a relatively large extent. By contrast, the rear axle is arranged under the vehicle floor behind the seat row, as a result of which the vehicle floor must have a higher level in this region.

The vehicle floor is then advantageously lowered in the region between the outer seats in such a way that a foot space is formed between the two outer seats in front of the pushed-back central seat. The passenger in the central seat then has the full seat height available, even in the pushed-back, rear seat position, and the seat itself does not have to be raised in terms of height with respect to the outer seats. This is possible if the vehicle floor can be lowered in the center of the vehicle up to a point just in front of the rear axle. Axle suspensions and/or body connection nodes are often situated below the outer seats, with the result that it is structurally barely possible to lower the vehicle floor. It is then possible for the lowered region limited to the central foot space to effectively provide the required foot space for the central seat.

It is also advantageous if seat rails are arranged to the left and right of the foot space for the central seat. Since the central seat may experience relatively large displacement to the rear, the seat rails are advantageously mounted on the vehicle floor. Because the seat rails are arranged to the left and right of the foot space, the central passenger does not have his comfort restricted since his feet do not stand on the seat rails. It is possible here for the seat rails to be connected to the vehicle floor by means of a frame. Alternatively, they may be connected to the seat mounting of the outer seats.

A connecting wall advantageously connects the vehicle floor in the foot space of the central seat to a higher level of the vehicle floor situated below an outer seat. A seat rail can then be mounted on this connecting wall. Since this connecting wall is oriented predominantly vertically, but at least extends relatively steeply, the seat rail is not automatically situated on the floor of the foot space at the point where the central passenger's feet stand on the vehicle floor.

Further details of the invention can be seen from the drawings, in which.

Figure 1:
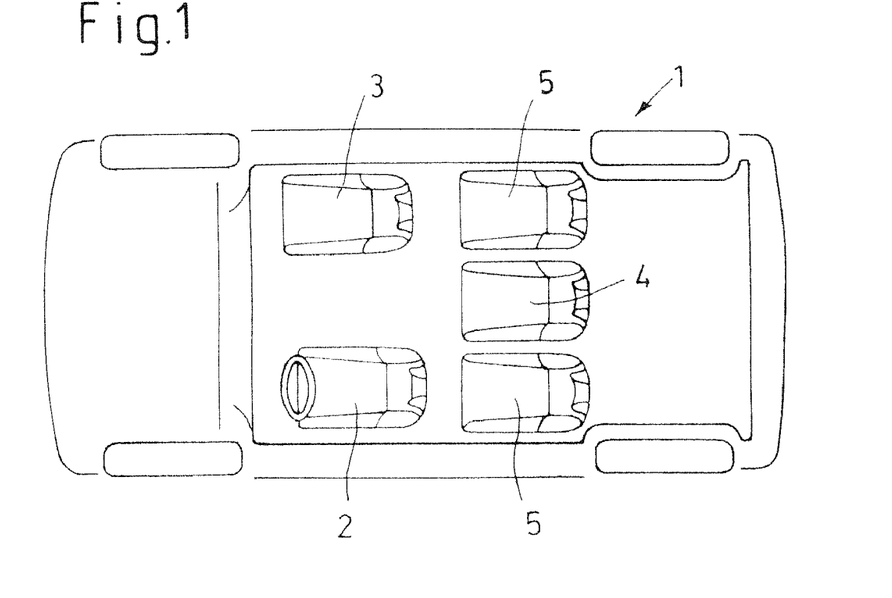
FIG. 1 shows a seat arrangement for a vehicle with two seat rows and with the second seat row in the normal position.

FIG. 1 represents a seat arrangement for a vehicle 1 having two seat rows, the front seat row comprising the driver's seat 2 and the front-passenger seat 3 and the second seat row comprising the central seat 4 and the two outer seats 5. The seats of the second seat row are situated in the normal position, i.e. they are not displaced or rotated relative to one another and are arranged in a line.

Figure 2:
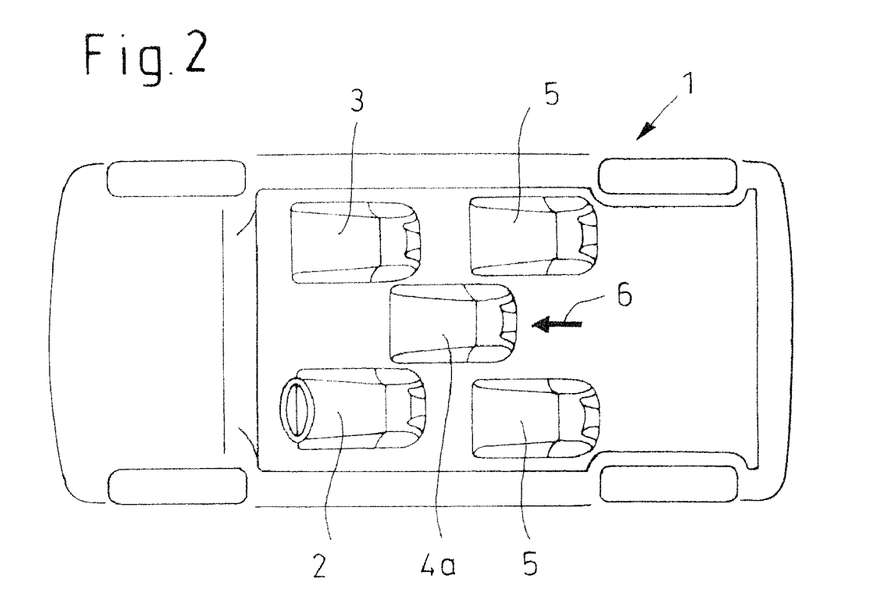
FIG. 2 shows the seat arrangement from FIG. 1 with the central seat displaced forward.

In FIG. 2, the central seat 4 from FIG. 1 is displaced forward, represented by the displacement arrow 6. The central seat 4a is now situated between the driver's seat 2 and front-passenger seat 3, albeit offset to the rear. Such a seat arrangement is suitable if, for example, a small child is being carried in a child seat on the central seat 4a. Both the driver and front passenger then have convenient access to the child, even during the journey, without having to undo their seatbelts or even leave their seats 2, 3.

Figure 3:
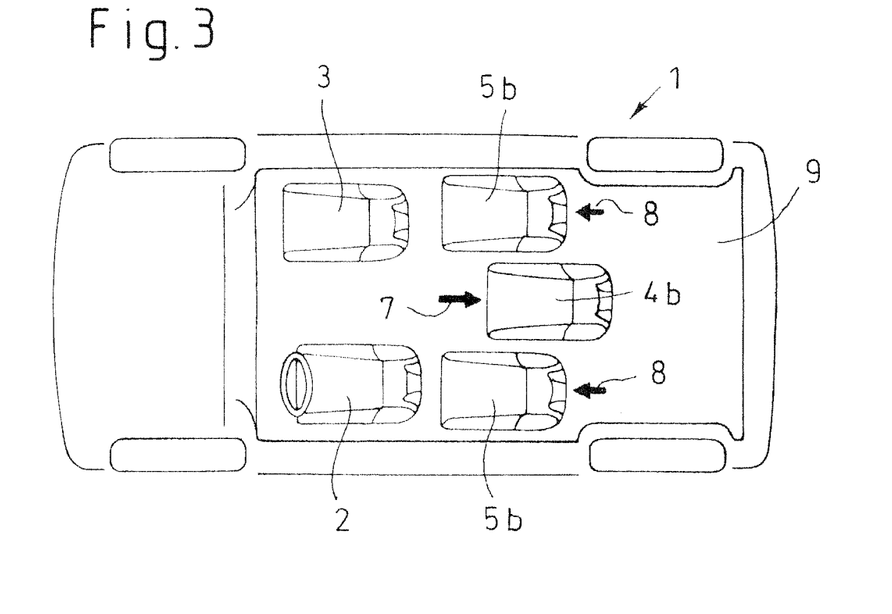
FIG. 3 shows the seat arrangement from FIG. 1 with the central seat displaced rearward and the outer seats displaced forward.

In FIG. 3, the central seat 4b is displaced slightly rearward by comparison with FIG. 1, denoted by the displacement arrow 7. The two outer seats 5b are displaced slightly forward, denoted by the displacement arrows 8. Although each of the three seats is displaced by only a small amount, the gain in comfort is at once considerable since the three seats are now no longer situated in a row. The luggage space 9 for its part is not restricted by the displacement, since the loss in space behind the central seat 4b is compensated by the gain in space behind the two outer seats 5b.

Figure 4:
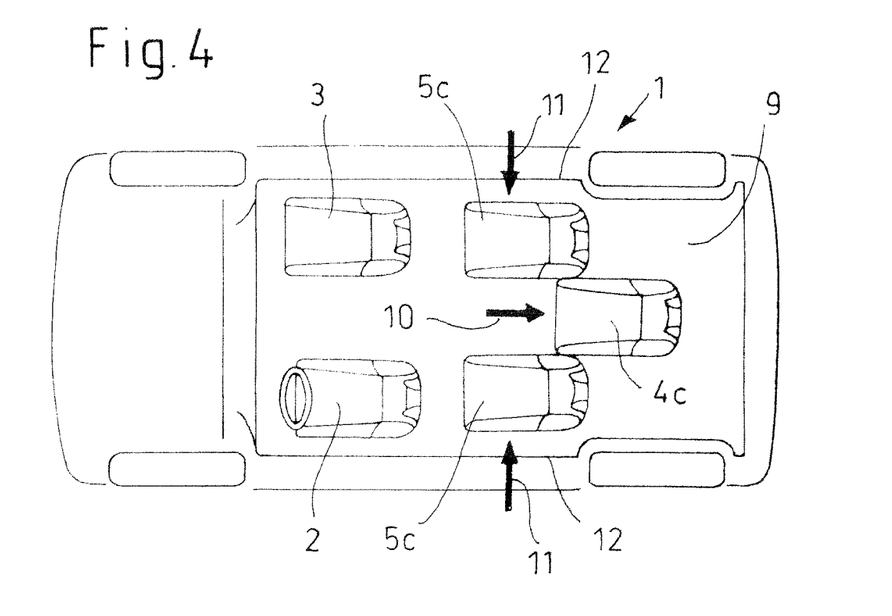
FIG. 4 shows the seat arrangement from FIG. 1 with the central seat displaced rearward and the outer seats displaced inward.

In FIG. 4, the central seat 4c is displaced a long way rearward with respect to FIG. 1, denoted by the displacement arrow 10. The two outer seats 5c are displaced inward, denoted by the displacement arrows 11. In this seat arrangement, the passenger in the central seat 4c enjoys a large freedom of movement, since there is no other passenger situated to the right and left at his level. The passengers in the two outer seats 5c are given greater shoulder room with respect to the vehicle side wall 12 by virtue of the inward displacement, as a result of which their feeling of comfort is likewise greatly increased, especially since there is no third passenger sitting between them.

Figure 5:
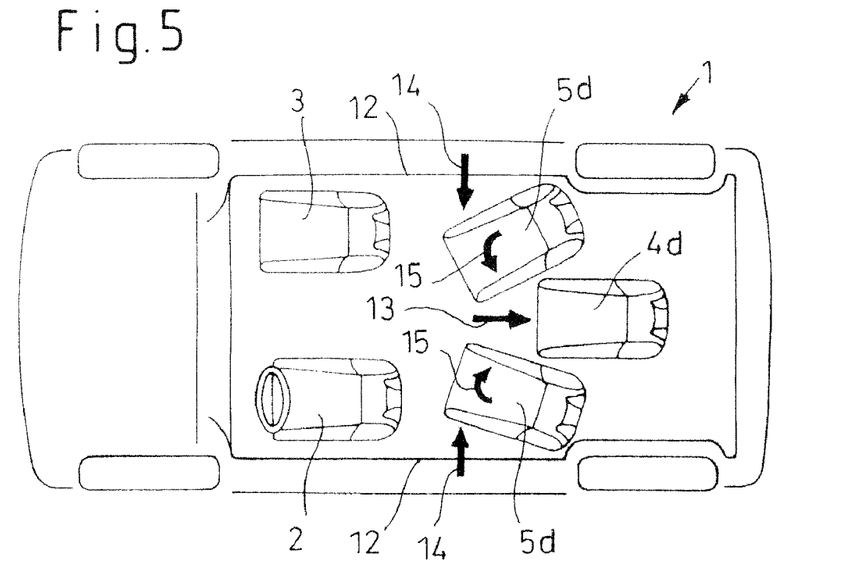
FIG. 5 shows the seat arrangement from FIG. 1 with the central seat displaced rearward and the outer seats rotated inward.

In FIG. 5, analogously to FIG. 4, the central seat 4d is displaced a long way rearward, denoted by the displacement arrow 13, and the two outer seats 5d are displaced inward, denoted by the displacement arrows 14. In addition, the outer seats 5d are both rotated inward, denoted by the rotation arrows 15, with the result that the passengers in the seats 5d assume a sitting position directed into the cabin. All three passengers in this seat row are thus given the feeling of comfort already described in FIG. 4, but with the additional effect that the three passengers in the seat row can see one another better without having to move awkwardly about in the seat. Furthermore, the rotation of the outer seats 5d increases the perceived distance between the passengers in these seats and the vehicle side wall 12. This leads overall to a further increase in the feeling of comfort, especially since communication between the three passengers is facilitated.

Figure 6:
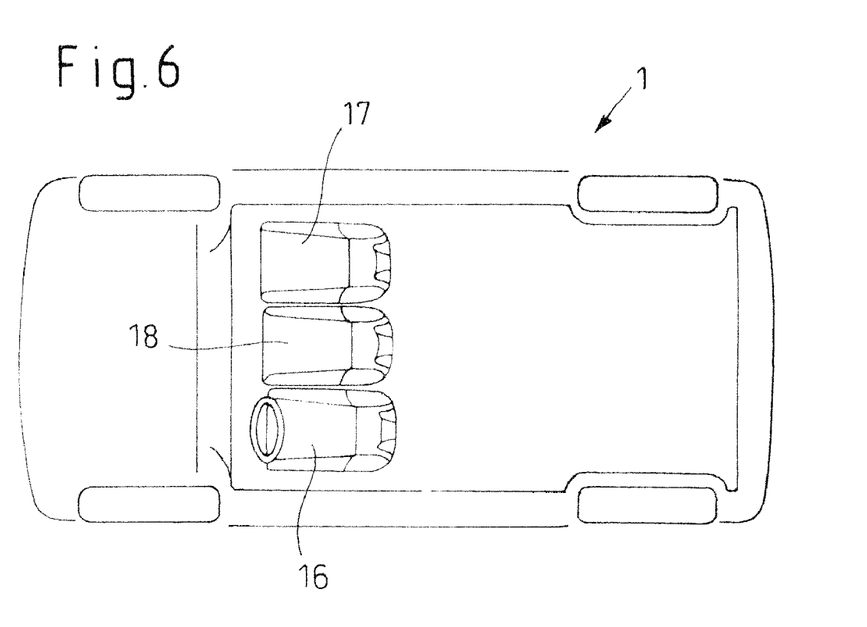
FIG. 6 shows a seat arrangement for a vehicle with a front seat row in the normal position.

FIG. 6 shows a seat arrangement for a vehicle having a front seat row according to the invention, the driver's seat 16 and the outer front-passenger seat 17 constituting the two outer seats, whereas the central front-passenger seat 18 constitutes the central seat. All the seats are shown in the normal position, i.e. they are arranged in a row. The driver's seat 16 and the outer front-passenger seat 17 can conventionally be displaced in the longitudinal direction. In this case, however, the central front-passenger seat 18 is also designed separately from the two outer seats 16, 17, i.e. the front passengers do not sit on a bench seat, and the central front-passenger seat 18 can be displaced in the longitudinal direction independently of the outer seats 16, 17. FIG. 6 shows only the front seat row in a vehicle 1. It is of course possible here to equip vehicles with only the inventive front seat row arrangement and provide a different seat arrangement or no seats at all in the rear vehicle region. However, the front seat row may also be combined with further inventive seat rows in the rear vehicle region.

Figure 7:
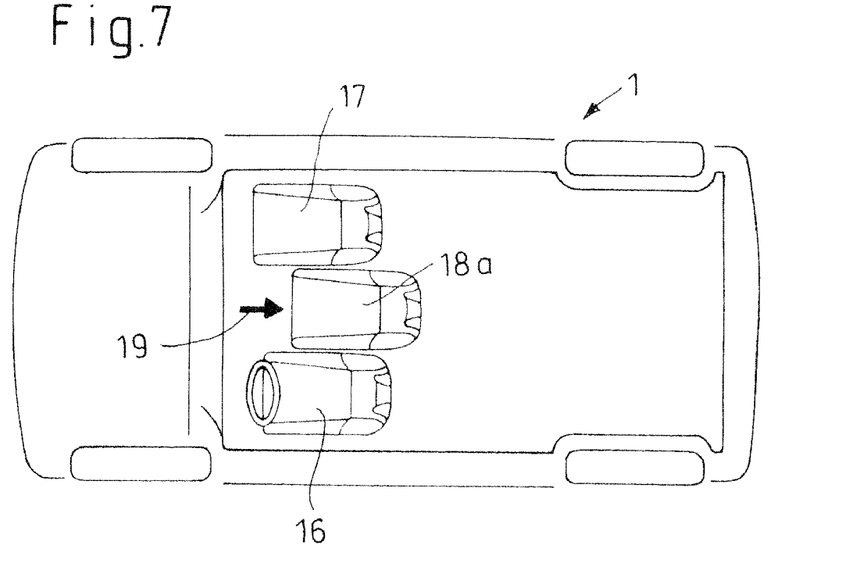
FIG. 7 shows the seat arrangement from FIG. 6 with the central seat displaced rearward.

FIG. 7 shows the seat arrangement from FIG. 6 with the central front-passenger seat 18a displaced rearward, denoted by the displacement arrow 19. While the central front passenger assumes a rear seat position, there is substantially greater shoulder room for the driver and also for the two front passengers, thereby increasing the feeling of comfort.

Figure 8:
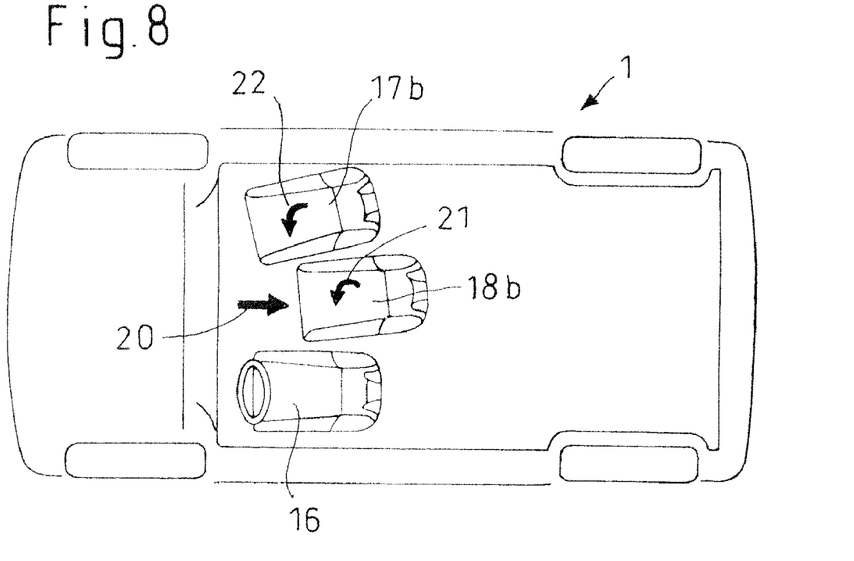
FIG. 8 shows the seat arrangement from FIG. 6 with the central seat displaced rearward and rotated toward the driver and with the outer seat rotated toward the driver.

FIG. 8, analogously to FIG. 7, shows the seat arrangement with the central front-passenger seat 18b displaced rearward, denoted by the displacement arrow 20. In addition, the central front-passenger seat 18b is rotated through a small angle and the outer front-passenger seat 17b is rotated through a somewhat greater angle in the direction of the driver, denoted by the rotation arrows 21 and 22, respectively. The rotated seat positions of the front-passenger seats 17b and 18b allow better communication between the driver and front passengers while at the same time providing an increased feeling of comfort owing to the greater shoulder room.

Figures 9A, 9B, 9C:
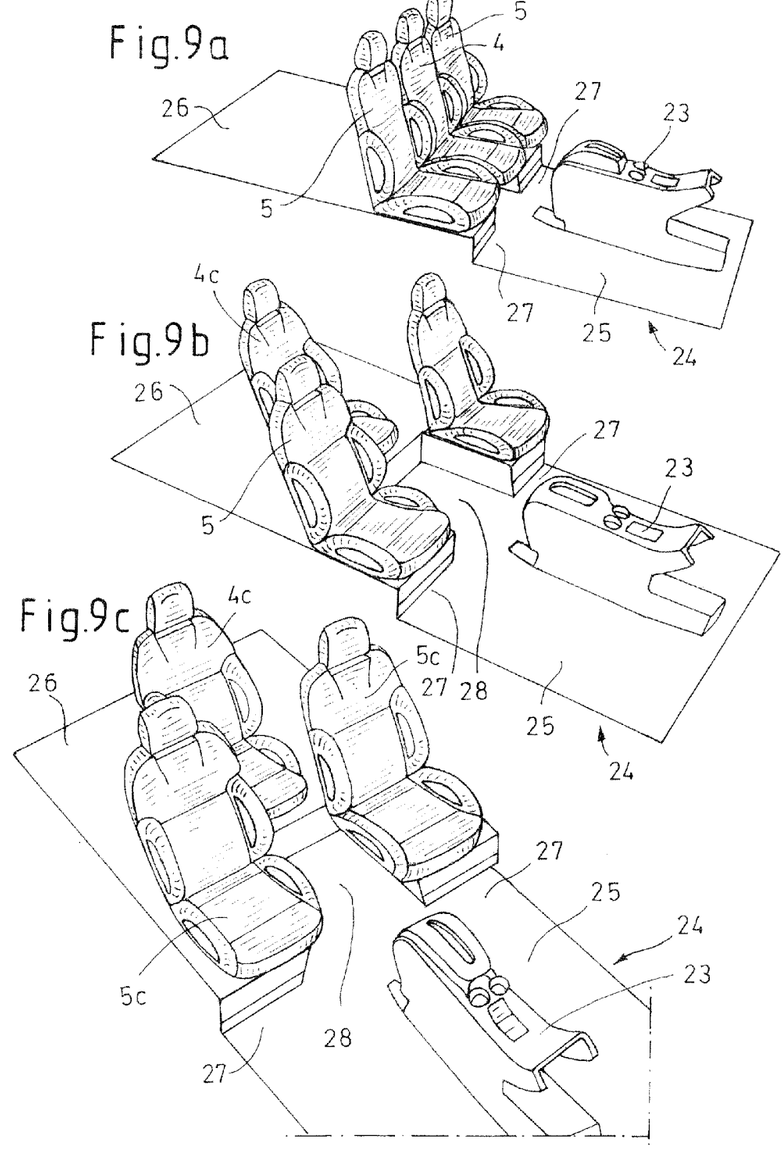
FIGS. 9a-c show perspective views of the displacement of the seat row from FIG. 4.

FIGS. 9a-c are perspective views showing the displacement of the seat row from FIG. 4, with FIG. 9a representing the starting position according to FIG. 1, FIG. 9b the position with the central seat 4c pushed back, and FIG. 9c the end position with the two outer seats 5c displaced inward. The two front seats are not represented, the central console 23 arranged between these two seats being represented schematically.

Also represented schematically is the vehicle floor 24, the latter forming a front, lower level 25 and a rear, higher level 26. Part of the front, lower level 25 comprises the foot space 27 for the passengers in the seat row. The rear, higher level 26 essentially forms the luggage space. To ensure that the central passenger also has sufficient foot space 28 available in the rear seat position, the vehicle floor 24 is lowered between the outer seats 5 so as to achieve approximately the height of the front, lower level 25. However, this is to be understood only on a purely schematic basis; of course, the foot space 28 may be structurally or functionally constrained to have a height which deviates from that of the front level 25.

Figure 10:
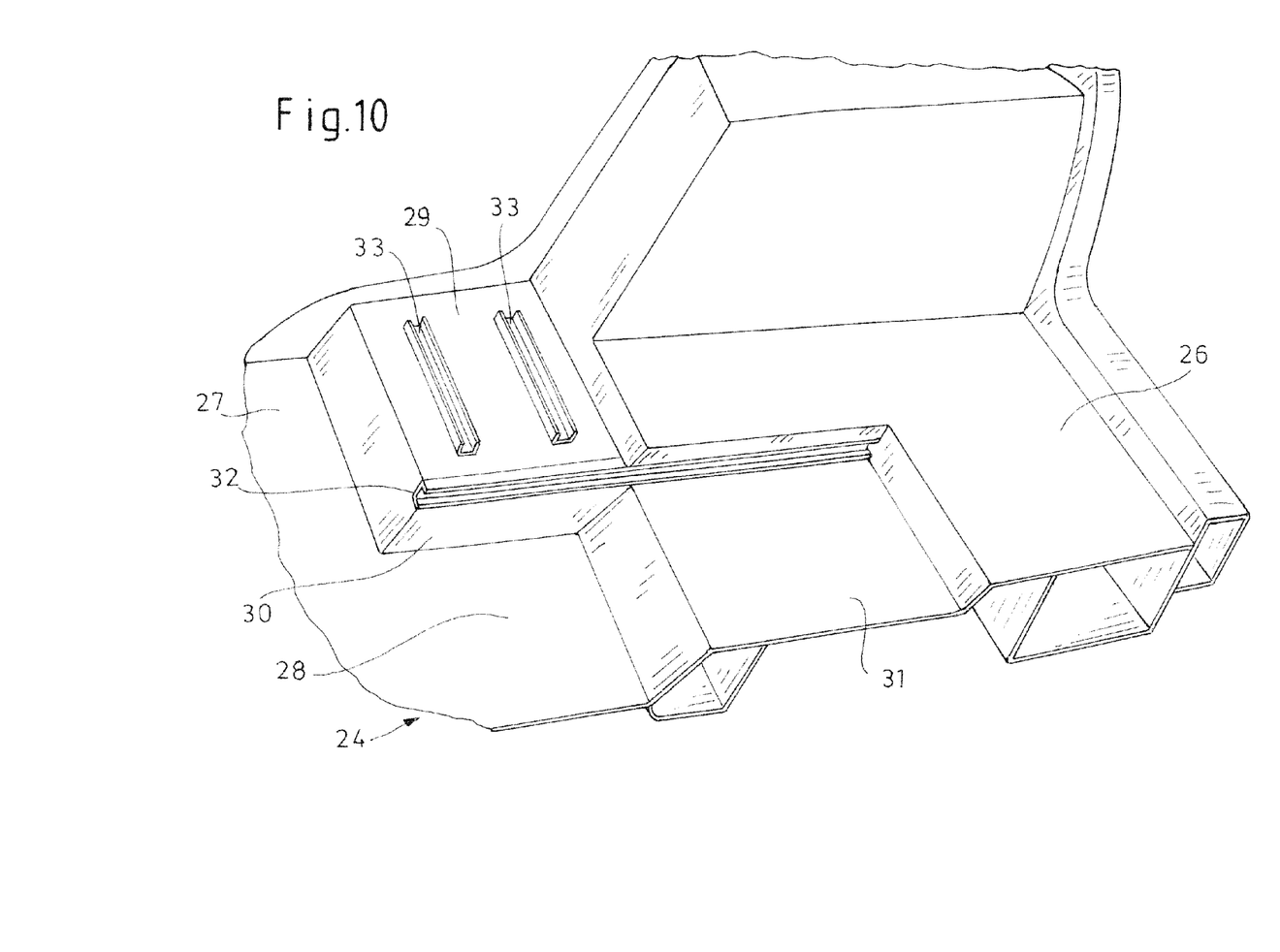
FIG. 10 shows a perspective view of a vehicle floor for a seat arrangement according to FIG. 4.

FIG. 10 is a perspective view showing a vehicle floor 24 for a seat arrangement according to FIG. 4. Here, the foot space 27 of the seat row forms a front, lower level, and the luggage space 26 forms a rear, higher level. The vehicle floor 24 in the foot space 28 for the pushed-back central seat has approximately the height of the vehicle floor 24 in the foot space 27 of the seat row. The vehicle floor 29 below the outer seats has a height which is above the height of the vehicle floor 24 in the foot space 28 of the central seat. A connecting wall 30 connects the vehicle floor 24 in the foot space 28 of the central seat to the vehicle floor 29 below the outer seats. The vehicle floor 31 is slightly lowered behind the foot space 28 with respect to the luggage space 26, at least in the region of the central seat in the rear seat position, in order to create space for the rearwardly displaced central seat.

A seat rail 32 for the central seat is mounted on the connecting wall 30. The seat rail 32 here extends into the lowered region 31 below the central seat. An identical seat rail is situated symmetrically with respect to the central level of the vehicle on the other side of the foot space 28. The two seat rails provide a wide support for the central seat, with the support being very rigid and favorable in terms of strength on account of the seat rails being firmly mounted on the predominantly vertical connecting wall 30. Furthermore, the predominantly vertical arrangement means that the seat rails do not interfere with the sitting comfort of the central passenger in the rear seat position.

Further seat rails 33 disposed transversely to the direction of travel of the vehicle are mounted on the vehicle floor 29 and the outer seats. An outer seat 5 (not shown here) is supported in said rails, allowing the inward displacement of the outer seat as described in FIG. 4 and FIG. 9*c*.

The invention claimed is:

1. A seat row arrangement for a vehicle, comprising two outer seats and a central seat, wherein the central seat can be displaced forward and/or rearward from the normal position between the two outer seats into a front and/or a rear seat position, and with the vehicle having a floor with a lower level in front of the seat row, in the foot space of the seat row, and a higher level behind the seat row, and wherein the vehicle floor is lowered in the region between the outer seats in such a way that a foot space is formed between the two outer seats in front of the pushed-back central seat.

2. The seat row arrangement as claimed in claim 1, wherein the central seat (18*b*) can be rotated in the front and/or rear seat position.

3. The seat row arrangement as claimed in claim 1, wherein at least one of the outer seats (5*b*) can be displaced into a front and/or rear seat position.

4. The seat row arrangement as claimed in claim 1, wherein at least one of the outer seats can be displaced into an inner seat position if the central seat is not situated directly next to this seat.

5. The seat row arrangement as claimed in claim 1, wherein at least one of the outer seats can be rotated if the central seat is not situated in a position directly next to this seat.

6. The seat row arrangement as claimed in claim 1, wherein the seats can be displaced on seat rails mounted on the vehicle floor.

7. The seat row arrangement as claimed in claim 1, wherein each seat is anchored to the vehicle floor and has dedicated seat rails.

8. The vehicle as claimed in claim 1, wherein seat rails are arranged to the left and right of the foot space for the central seat.

9. The vehicle as claimed in claim 8, wherein a connecting wall connects the vehicle floor in the foot space of the central seat to a higher level of the vehicle floor situated below an outer seat and a seat rail is mounted on this connecting wall.

* * * * *